US012492750B2

(12) United States Patent
Kumar et al.

(10) Patent No.: US 12,492,750 B2
(45) Date of Patent: Dec. 9, 2025

(54) FLOW CELL ASSEMBLIES AND RELATED SYSTEMS

(71) Applicant: ILLUMINA, INC., San Diego, CA (US)

(72) Inventors: Ashish Kumar, San Diego, CA (US); James Osmus, San Diego, CA (US); David Kaplan, Carlsbad, CA (US); Richard Lemoine, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 4 days.

(21) Appl. No.: 18/398,826

(22) Filed: Dec. 28, 2023

(65) Prior Publication Data

US 2024/0125387 A1     Apr. 18, 2024

Related U.S. Application Data

(63) Continuation of application No. 17/590,520, filed on Feb. 1, 2022, now Pat. No. 11,892,080.

(Continued)

(51) Int. Cl.
*F16J 15/10* (2006.01)
*H01M 50/183* (2021.01)
*F28F 3/10* (2006.01)

(52) U.S. Cl.
CPC .......... *F16J 15/104* (2013.01); *H01M 50/183* (2021.01); *F28F 3/10* (2013.01)

(58) Field of Classification Search
CPC ...... F28F 3/10; H01M 50/183; H01M 8/0276; F16J 15/104
See application file for complete search history.

(56) References Cited

U.S. PATENT DOCUMENTS

| 5,401,901 A | 3/1995 | Gerry et al. |
| 5,524,908 A | 6/1996 | Reis |

(Continued)

FOREIGN PATENT DOCUMENTS

| JP | 2022-125885 A | 8/2022 |
| TW | 202016236 A | 5/2020 |

OTHER PUBLICATIONS

Nitto, "Double-Sided Tape for Adhesion to Silicone Rubber No. 5302A." Retrieved from the Internet at <https://www.nitto.comiusien/products/double1014/> (Mar. 16, 2021).

*Primary Examiner* — Eugene G Byrd
(74) *Attorney, Agent, or Firm* — MARSHALL, GERSTEIN & BORUN LLP

(57) ABSTRACT

Gasket assemblies and related system and methods. An apparatus includes a system, a flow cell, and a plurality of gasket assemblies. The system includes a flow cell interface and the flow cell has one or more channels. Each channel has a first channel opening and a second channel opening. The first channel openings are positioned at a first end of the flow cell and the second channel openings are positioned at a second end of the flow cell. A gasket assembly coupled at each second channel opening. Each gasket assembly includes an adhesive stack and a gasket. The adhesive stack includes a first side bonded to the gasket and a second side bonded to the flow cell. The flow cell interface is engagable with the corresponding gaskets to establish a fluidic coupling between system and the flow cell.

20 Claims, 11 Drawing Sheets

Related U.S. Application Data

(60) Provisional application No. 63/170,946, filed on Apr. 5, 2021, provisional application No. 63/199,916, filed on Feb. 2, 2021.

(56) References Cited

U.S. PATENT DOCUMENTS

| | | |
|---|---|---|
| 6,190,751 B1 | 2/2001 | Sylvester |
| 6,255,581 B1 | 7/2001 | Reis et al. |
| 6,451,398 B1 | 9/2002 | Sylvester |
| 6,734,537 B1 | 5/2004 | Hudson et al. |
| 7,097,892 B2 | 8/2006 | Sano |
| 8,900,529 B2 | 12/2014 | Shaikh et al. |
| 10,357,775 B2 | 7/2019 | Kaplan et al. |
| 11,913,551 B2 * | 2/2024 | Akin ................. F16J 15/022 |
| 2009/0224482 A1 | 9/2009 | Nurse |
| 2011/0132477 A1 | 6/2011 | Chen et al. |
| 2012/0032639 A1 | 2/2012 | Kim et al. |
| 2012/0225299 A1 | 9/2012 | Takahashi |
| 2012/0326391 A1 | 12/2012 | Hirose et al. |
| 2016/0023206 A1 | 1/2016 | Lenigk et al. |
| 2016/0033043 A1 | 2/2016 | Busby et al. |
| 2016/0161392 A1 | 6/2016 | Ionescu-Zanetti et al. |
| 2017/0203292 A1 | 7/2017 | Lenigk et al. |
| 2018/0119855 A1 | 5/2018 | Bond et al. |
| 2018/0185849 A1 | 7/2018 | Kaplan et al. |
| 2018/0187252 A1 | 7/2018 | Hunter et al. |
| 2019/0107200 A1 | 4/2019 | Heartwell et al. |
| 2019/0291115 A1 | 9/2019 | Kaplan et al. |
| 2020/0030795 A1 | 1/2020 | Pais et al. |
| 2020/0284777 A1 | 9/2020 | Clark et al. |
| 2021/0080479 A1 | 3/2021 | Drews et al. |
| 2021/0170406 A1 | 6/2021 | Wang et al. |
| 2022/0026345 A1 | 1/2022 | Tsuchida et al. |

* cited by examiner

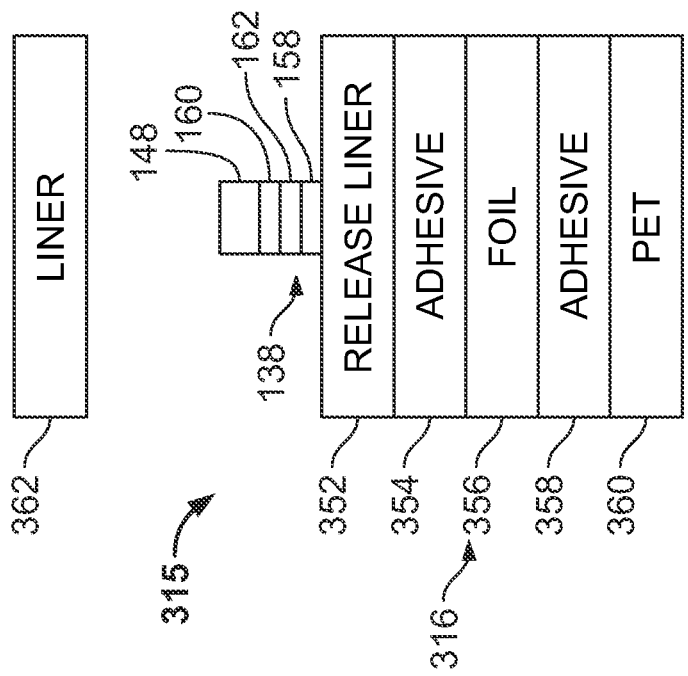
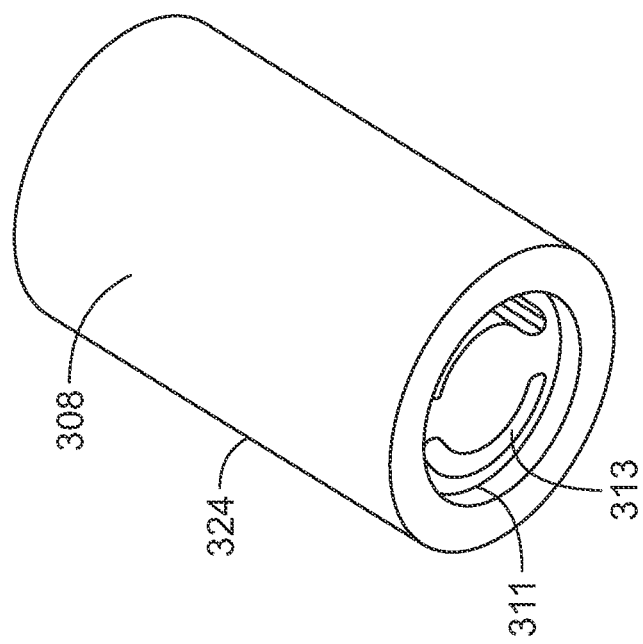

FLOW CELL ASSEMBLIES AND RELATED SYSTEMS

RELATED APPLICATION

This application claims the benefit of and priority to U.S. Provisional Patent Application No. 63/170,946, filed Apr. 5, 2021; U.S. Provisional Patent Application No. 63/199,916, filed Feb. 2, 2021; and U.S. Nonprovisional patent application Ser. No. 17/590,520, filed Feb. 1, 2022, the content of each of which is incorporated by reference herein in their entireties and for all purposes.

BACKGROUND

Sequencing platforms may include fluidic interfaces that can form a fluidic connection with a flow cell.

SUMMARY

Advantages over the prior art can and benefits as described later in this disclosure can be achieved through the provision of gasket assemblies and related systems and methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus includes a flow cell. The flow cell has one or more channels. Each channel has a first channel opening and a second channel opening. The first channel openings are positioned at a first end of the flow cell and the second channel openings are positioned at the second end of the flow cell. A gasket assembly is coupled at each second channel opening. Each gasket assembly includes an adhesive stack and a gasket. The adhesive stack includes a first side bonded to the gasket and a second side bonded to the flow cell.

In accordance with a second implementation, an apparatus includes a gasket assembly including a gasket and an adhesive stack including a first adhesive, a separating layer, and a second adhesive. The separating layer has a first side at least partially covered by the first adhesive and a second side. The second adhesive at least partially covers the second side of the separating layer. The separating layer is positioned between the first adhesive and the second adhesive. The gasket is bonded to the second adhesive. The second adhesive is positioned between the separating layer and the gasket. The apparatus also includes a release liner to which the first adhesive of the adhesive stack is releasably bonded.

In accordance with a third implementation, an apparatus includes a system and a flow cell. The system includes a flow cell interface and the flow cell has one or more channels. Each channel has a first channel opening and a second channel opening. The first channel openings are positioned at a first end of the flow cell and the second channel openings are positioned at a second end of the flow cell. A gasket assembly is coupled at each second channel opening. Each gasket assembly includes an adhesive stack and a gasket. The adhesive stack includes a first side bonded to the gasket and a second side bonded to the flow cell. The flow cell interface is engagable with the corresponding gaskets to establish a fluidic coupling between system and the flow cell.

In accordance with a fourth implementation, a method includes picking up a gasket assembly using a head of a pick-and-place machine. The gasket assembly includes an adhesive stack and a gasket. The adhesive stack includes a first side bonded to the gasket and a second side. The method includes placing the second side of the gasket assembly onto a surface surrounding an opening of a channel of a flow cell.

In accordance with a fifth implementation, an apparatus includes a flow cell including a channel including a channel opening and a gasket assembly coupled at the channel opening. The gasket assembly includes an adhesive stack and a gasket. The adhesive stack includes a first side bonded to the gasket and a second side bonded to the flow cell.

In an accordance with a sixth implementation, an apparatus includes an adhesive backed gasket.

In accordance with a seventh implementation, a method includes picking an adhesive backed gasket and placing the adhesive backed gasket on a flow cell. The method also includes pressing the adhesive backed gasket to the flow cell thereby coupling the adhesive backed gasket to the flow cell.

In further accordance with the foregoing first, second, third, fourth, fifth, sixth, and/or seventh implementations, an apparatus and/or method may further include or comprise any one or more of the following:

In an implementation, the adhesive stack has a through hole and the gasket has a through hole that is aligned with the through hole of the adhesive stack to enable fluidic communication through the gasket assembly.

In another implementation, the adhesive stack includes a first adhesive coupled to the flow cell and a second adhesive coupled to the gasket and positioned between the first adhesive and the gasket.

In another implementation, each gasket assembly further includes a separating layer positioned between the first adhesive and the second adhesive. The first adhesive bonds to both the flow cell and the separating layer and the second adhesive bonds to both the separating layer and the gasket.

In another implementation, the separating layer includes polyethylene terephthalate.

In another implementation, the separating layer includes a through hole and the gasket has a through hole aligned with the through hole of the separating layer. The first adhesive coats a first side of the separating layer and the second adhesive coats a second side of the separating layer.

In another implementation, the first adhesive includes acrylic adhesive.

In another implementation, the second adhesive includes silicone adhesive.

In another implementation, the gasket includes a silicone elastomer.

In another implementation, the apparatus includes a flow cell manifold coupled to the first end of the flow cell and includes a flow cell manifold inlet, a plurality of fluidic lines, and a plurality of flow cell manifold outlets fluidically coupled to the flow cell manifold inlet by the corresponding fluidic lines. Each of the flow cell manifold outlets is coupled to a corresponding first channel opening of the flow cell.

In another implementation, the apparatus includes a manifold gasket assembly coupled to the flow cell manifold inlet.

In another implementation, the manifold gasket assembly includes a first adhesive coupled to the flow cell manifold, a gasket, and a second adhesive coupled to the gasket and positioned between the first adhesive and the second adhesive.

In another implementation, the flow cell manifold includes a laminate.

In another implementation, the apparatus includes a liner assembly including the release liner, permanent adhesive and a foil layer, the permanent adhesive bonding the foil layer and the release layer.

In another implementation, the liner assembly further includes a third adhesive and a polyethylene terephthalate layer. The third adhesive bonding the foil layer and the polyethylene terephthalate layer.

In another implementation, the apparatus includes a plurality of the gasket assemblies. Each of the gasket assemblies being spaced apart and coupled to the release liner.

In another implementation, the plurality of gasket assemblies are coupled to the release liner and form a roll.

In another implementation, the flow cell interface includes a plurality of plungers that are engagable with the corresponding gaskets.

In another implementation, the apparatus includes springs that bias the corresponding plungers.

In another implementation, the flow cell interface includes a plunger guide including plunger bores in which the corresponding plungers are positioned.

In another implementation, the system further includes a vacuum chuck that supports the flow cell.

In another implementation, the vacuum chuck supports a substantial length of the flow cell between the first end and the second end.

In another implementation, the apparatus includes a flow cell frame to which the flow cell and the plurality of gasket assemblies are coupled.

In another implementation, the method includes pressing the gasket assembly toward the surface of the flow cell, thereby coupling the second side of the adhesive stack to the surface of the flow cell.

In another implementation, the method includes dispensing the gasket assembly from a roll including a plurality of the gasket assemblies.

In another implementation, dispensing the gasket assembly from the roll includes passing the gasket assembly through a guide.

In another implementation, the method includes detecting a location of the gasket assembly using a sensor prior to picking up the gasket assembly.

In another implementation, the adhesive stack includes a first adhesive on the first side of the adhesive stack, a second adhesive on the second side of the adhesive stack, and a separating layer positioned between the first adhesive and the second adhesive.

In another implementation, the first adhesive includes an acrylic adhesive, the second adhesive includes a silicone adhesive, and the separating layer includes a polyethylene terephthalate layer.

In another implementation, the gasket includes a silicone elastomer.

In another implementation, the adhesive backed gasket includes an adhesive stack.

In another implementation, the adhesive stack includes polyethylene terephthalate between an acrylic adhesive and a silicone adhesive.

In another implementation, the silicone adhesive is adjacent to the gasket.

In another implementation, the gasket includes a silicone elastomer.

In another implementation, the apparatus further includes a flow cell. The adhesive backed gasket is coupled to the flow cell.

In another implementation, the apparatus further includes a laminate and a flow cell. The laminate is coupled to the flow cell and the gasket is coupled to the laminate.

In another implementation, the flow cell includes a plurality of the channels.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

FIG. 10 illustrates an isometric view of a head that can be used with the system of FIG. 9.

FIG. 11 is a cross-sectional view of a portion of the roll of gasket assemblies that can be used with the system of FIG. 9.

DETAILED DESCRIPTION

Figure 1:
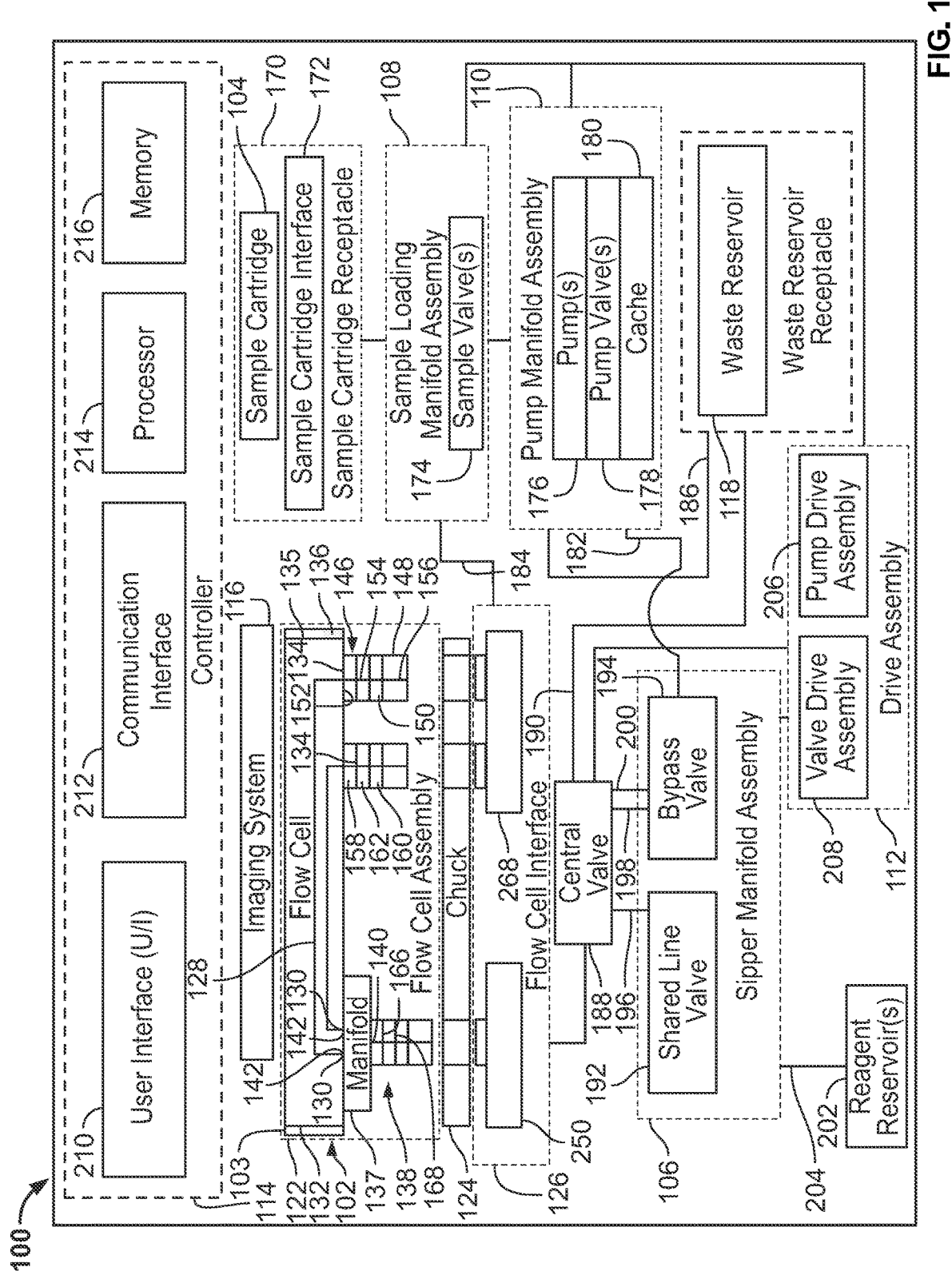
FIG. 1 illustrates a schematic diagram of an implementation of a system in accordance with the teachings of this disclosure.

Although the following text discloses a detailed description of implementations of methods, apparatuses, and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

This disclosure is directed toward flow cell cartridge assemblies including a flow cell having a plurality of channels. The flow cell may or may not include a flow cell manifold having a single inlet and a plurality of outlets. The outlets of the flow cell manifold are coupled to the channels of the flow cell. To facilitate a fluidic coupling between the channels and the associated system that is used to, for example, perform an analysis on a sample of interest, a gasket may be provided at the outlets of the channels. The gasket may span a width of the flow cell and has holes that correspond to the outlets of each of the channels. While this single gasket is effective at establishing a sealed connection between the flow cell and the associated system, when the flow cell includes a plurality of channels (e.g., eight channels), alignment stack ups between the gasket and the outlets of the channels may be exasperated. While the above example mentions the flow cell including a plurality of channels, flow cells in accordance with the teachings of this disclosure may include a single channel.

At least one aspect of this disclosure is directed toward flow cell cartridge assemblies and related systems that allow for decreased manufacturing tolerances and also a decreased amount of force that may be involved to establish a fluidic connection between the flow cell and the system. In some implementations, a fluidic connection can be established between the system and the flow cell using a force of approximately 1.2 Newton (N) or less. For example, the gaskets and related methods disclosed herein may provide approximately a 30% reduction in sealing force as compared to other methods such as gaskets coupled by brackets, thereby greatly reducing flow cell housing size and complexity. Lower sealing force also may result in less flow cell warpage, leading to improved optics and thermal interface. As such, the disclosed implementations reduce the likelihood of a fluidic connection not being established between the flow cell and the system and also reduces the likelihood that engagement between the flow cell and the system adversely affects the flatness of the flow cell.

Using the disclosed implementations, there may also be a common line volume reduction compared to gaskets coupled by brackets. Adhesive backed gaskets as disclosed herein may also enable smaller tolerance stack up on port alignment and fewer moving parts. The gaskets and related methods of use and manufacture also provide benefits and advantages related to flexible design to accommodate multiple configurations of flow cells.

The disclosed flow cell cartridge assemblies include adhesive backed gaskets that are individually adhered at each of the outlets of the respective channels and to the inlet of the flow cell manifold. Alternatively, the flow cell manifold may be omitted and the adhesive backed gaskets may be coupled at the inlets of the respective channels. The adhesive backed gaskets may include an adhesive stack and a gasket, where the adhesive stack has a first side bonded to the gasket and a second side bonded to the flow cell.

The adhesive stack may include a first adhesive coupled to the flow cell and a second adhesive coupled to the gasket and positioned between the first adhesive and the gasket. Including the two adhesives allows the adhesive backed gasket to adhere to both the flow cell made of glass and the gasket made of a silicone elastomer. The adhesive stack may also include a separating layer that is positioned between the first adhesive and the second adhesive. The first adhesive can bond to both the flow cell and the separating layer and the second adhesive can bond to both the separating layer and the gasket. In some implementations, the first adhesive is acrylic adhesive, the second adhesive is silicone adhesive, and the separating layer includes polyethylene terephthalate (PET). However, other types of adhesives or separating layers may be used.

In some implementations, the gaskets may be provided on a tape reel such that the gaskets can be fed into a precision pick-and-place (PNP) machine using a label feeder concept. This may involve feeding the gaskets onto a non-stick surface of the label feeder to allow a head of a vacuum nozzle to pick up and place the gasket onto a flow cell for automated assembly.

At least some of the example gaskets and method of using/applying a gasket to a flow cell described herein help to reduce the manifold sealing force significantly, thereby reducing the complexity and/or cost of the flow cell holder architecture. A pick-and-place machine may be used for assembly, namely, for applying an adhesive backed gasket to a flow cell or laminate structure supporting or fluidically connected to the flow cell. In some examples, a pick-and-place machine is used to pick up a gasket from a label feeder and then align and place the gasket over/around a hole of a flow cell, where the hole acts as a port providing fluidic access to a flow channel of the flow cell.

FIG. 1 illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). In the implementation shown, the system 100 is adapted to receive a flow cell cartridge assembly 102 including a flow cell 103 and a sample cartridge 104 and includes, in part, a sipper manifold assembly 106, a sample loading manifold assembly 108, and a pump manifold assembly 110. The system 100 also includes a drive assembly 112, a controller 114, an imaging system 116, and a waste reservoir 118. The controller 114 is electrically and/or communicatively coupled to the drive assembly 112 and to the imaging system 116 and is adapted to cause the drive assembly 112 and/or the imaging system 116 to perform various functions as disclosed herein.

The system 100 includes a flow cell receptacle 122 that receives the flow cell cartridge assembly 102, a vacuum chuck 124 that supports the flow cell 103, and a flow cell interface 126 that is used to establish a fluidic coupling between the system 100 and the flow cell 103. The flow cell interface 126 may include one or more manifolds.

Referring initially to the flow cell 103, in the implementation shown, the flow cell 103 includes a plurality of channels 128, each having a first channel opening 130 positioned at a first end 132 of the flow cell 103 and a second channel opening 134 positioned at a second end 135 of the flow cell 103. Depending on the direction of flow through the channels 128, either of the channel openings 130, 134 may act as an inlet or an outlet. While the flow cell 2 is shown including two channels 128 in FIG. 1, any number of channels 128 may be included (e.g., 1, 2, 6, 8) (see, FIGS. 5 and 8).

The flow cell cartridge assembly 102 also includes a flow cell frame 136, a flow cell manifold 137 coupled to the first end 132 of the flow cell 103, and a plurality of gasket assemblies 138 coupled at the corresponding second channel openings 134. As used herein, a "flow cell" (also referred to as a flowcell) can include a device having a lid extending over a reaction structure to form a flow channel therebetween that is in communication with a plurality of reaction sites of the reaction structure. Some flow cells may also include a detection device that detects designated reactions that occur at or proximate to the reaction sites. As shown, the flow cell 103, the flow cell manifold 137, and the gasket assemblies 138 are coupled or otherwise carried by the flow cell frame 136. While the flow cell frame 136 is shown included with the flow cell cartridge assembly 102 of FIG. 1, the flow cell frame 136 may be omitted. As such, the flow cell 103 and the associated gasket assemblies 138 may be used with the system 100 without the flow cell frame 136.

Figure 5:
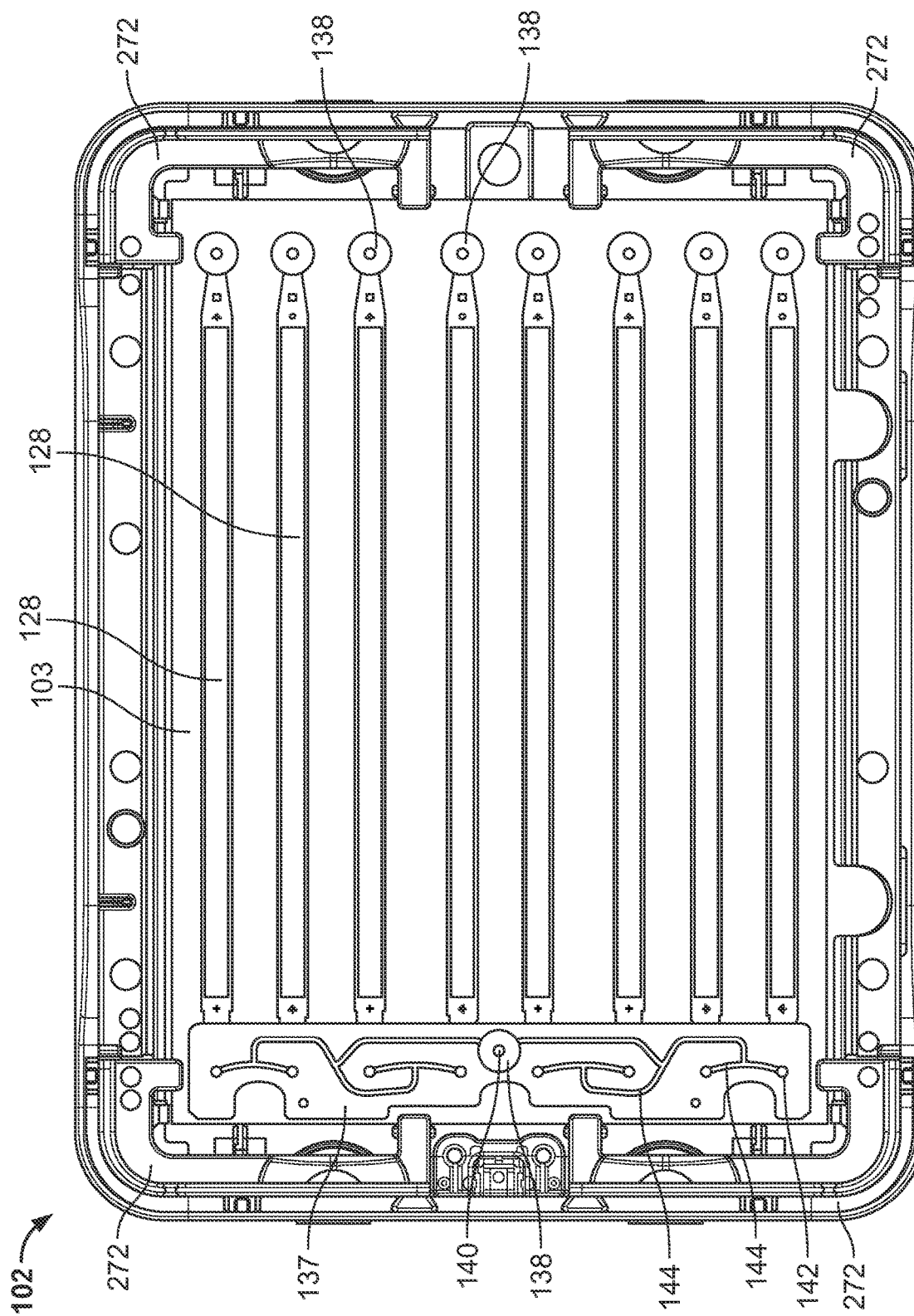
FIG. 5 is a bottom plan view of the flow cell cartridge assembly of FIG. 4.

In the implementation shown, the flow cell manifold 137 may be a laminate and include a single inlet 140 and a plurality of outlets 142 that are each coupled to the inlet 140 by a plurality of fluidic lines 144 (the fluidic lines 144 are more clearly shown in FIG. 5). One of the gasket assemblies 138 is also coupled at the inlet 140 of the flow cell manifold 137. The outlets 142 of the flow cell manifold 137 are aligned with and positioned adjacent to the first flow cell openings 130. As such, fluid can flow between the outlets 142 of the manifold 137 and the first openings 130 of the channels 128. While the flow cell cartridge assembly 102 of FIG. 1 is shown including the flow cell manifold 137, in other implementations, the flow cell manifold 137 may be omitted. When the flow cell manifold 137 is omitted, the gasket assemblies 138 can be coupled at the first channel openings 130 in a manner similar to the couplings between the gasket assemblies 138 and the flow cell 103 at the second channel openings 134

Referring to the gasket assemblies 138, in the implementation shown, each gasket assembly 138 includes an adhesive stack 146 and a gasket 148. The adhesive stack 146 has a first side 150 bonded to the gasket 148 and a second side 152 bonded to the flow cell 103. The adhesive stack 146 and the gasket 148 form an adhesive backed gasket having an annular shape and the adhesive stack 146 may be formed by a double-sided pressure-sensitive adhesive tape. The second side 152 of the adhesive stack 146 may be bonded to the flow cell 103 using adhesive or covalent bonds. Covalent bonds may be formed by activing glass of the flow cell 103 and activing the second side 152 of the adhesive stack 146 made of silicone and placing the flow cell 103 and the second side 152 of the adhesive stack 146 in contact with one another, for example. The glass of the flow cell 103 and/or the second side 152 of the adhesive stack 146 may be activated by altering the surface energy of the material to favor a certain property such as hydrophobicity, reactivity, bonding, and/or morphology. Heat and/or pressure may also or alternatively be used to activate the glass of the flow cell 103 and/or the second side 152 of the adhesive stack 146.

In operation, the flow cell interface 126 engages with the corresponding gaskets 148 to establish a fluidic coupling between the system 100 and the flow cell 103. The engagement between the flow cell interface 126 and the gasket assemblies 138 reduces or eliminates fluid leakage between the flow cell interface 126 and the flow cell 103.

Referring still to the gasket assemblies 138, the adhesive stack 146 and the gasket 148 have through holes 154, 156 that are aligned with one another to enable fluidic communication through the gasket assembly 138. Thus, fluid can flow into and/or out of the flow cell 103 through the gasket assemblies 138. In the implementation shown, the adhesive stack 146 includes a first adhesive 158 coupled to the flow cell 103 and a second adhesive 160 coupled to the gasket 148 and positioned between the first adhesive 158 and the gasket 148. The adhesive stack 146 also includes a separating layer 162 that is positioned between the first adhesive 158 and the second adhesive 160. The first adhesive 158 bonds to both the flow cell 103 and the separating layer 162 and the second adhesive 160 bonds to both the separating layer 162 and the gasket 148.

To allow fluid to pass through the gasket assembly 138, the separating layer 162 defines the through hole 154 that is aligned with the through hole 156 of the gasket 148. In the implementation shown, the first adhesive 158 coats a first side 166 of the separating layer 162 and the second adhesive 160 coats a second side 168 of the separating layer 162. The first adhesive 158 and/or the second adhesive 160 may fully coat, partially coat, or form a pattern on the separating layer 162.

The first adhesive 158 may be acrylic adhesive, the second adhesive 160 may be silicone adhesive, the separating layer 162 may include polyethylene terephthalate (PET), and the gasket 148 may be a silicone elastomer. The gasket 148 may include or otherwise be formed from a silicon sheet, Dynaflex™ G7702 (TPE), a platinum cured silicone, Santoprene 8281-35 (TPV), thermoplastic elastomers, polypropylene based polymers, synthetic rubbers, thermoplastic vulcanizate, etc. However, different adhesives may be used for either the first and/or second adhesives 158, 160 and/or different elastomers may be used for the gasket 148. For example, the first adhesive 158 of the gasket assembly 138 that is coupled to the flow cell manifold 137 may be bondable to the flow cell manifold 137 made of PET while the first adhesive 158 of the gasket assembly 138 that is coupled to the flow cell 102 may be bondable to the flow cell 103 made of glass. However, the flow cell manifold 137 and/or the flow cell 103 may be made of the different materials than those mentioned, including the flow cell manifold 137 and/or the flow cell 103 being made of the same material.

Referring now to the sample cartridge 104, the sample loading manifold assembly 108, and the pump manifold assembly 110, in the implementation shown, the system 100 includes a sample cartridge receptacle 170 that receives the sample cartridge 104 that carries one or more samples of interest (e.g., an analyte). The system 100 also includes a sample cartridge interface 172 that establishes a fluidic connection with the sample cartridge 104.

The sample loading manifold assembly 108 includes one or more sample valves 174 and the pump manifold assembly 110 includes one or more pumps 176, one or more pump valves 178, and a cache 180. One or more of the valves 174, 178 may be implemented by a rotary valve, a pinch valve, a flat valve, a solenoid valve, a check valve, a piezo valve, and/or a three-way valve. However, different types of fluid control devices may be used. One or more of the pumps 176 may be implemented by a syringe pump, a peristaltic pump, and/or a diaphragm pump. However, other types of fluid transfer devices may be used. The cache 180 may be a serpentine cache and may temporarily store one or more reaction components during, for example, bypass manipulations of the system 100 of FIG. 1. While the cache 180 is shown being included in the pump manifold assembly 110, in another implementation, the cache 180 may be located in a different location. For example, the cache 180 may be included in the sipper manifold assembly 106 or in another manifold downstream of a bypass fluidic line 182.

The sample loading manifold assembly 108 and the pump manifold assembly 110 flow one or more samples of interest from the sample cartridge 104 through a fluidic line 184 toward the flow cell cartridge assembly 102. In some implementations, the sample loading manifold assembly 108 can individually load/address each channel 128 of the flow cell 125 with a sample of interest. The process of loading the channels 128 with a sample of interest may occur automatically using the system 100 of FIG. 1.

As shown in the system 100 of FIG. 1, the sample cartridge 104 and the sample loading manifold assembly 108 are positioned downstream of the flow cell cartridge assembly 102. Thus, the sample loading manifold assembly 108 may load a sample of interest into the flow cell 103 from the rear of the flow cell 103. Loading a sample of interest from the rear of the flow cell 103 may be referred to as "back loading." Back loading the sample of interest into the flow cell 103 may reduce contamination. In the implementation shown, the sample loading manifold assembly 108 is coupled between the flow cell cartridge assembly 102 and the pump manifold assembly 110.

To draw a sample of interest from the sample cartridge 104 and toward the pump manifold assembly 110, the sample valves 174, the pump valves 178, and/or the pumps 176 may be selectively actuated to urge the sample of interest toward the pump manifold assembly 110. The sample cartridge 104 may include a plurality of sample reservoirs that are selectively fluidically accessible via the corresponding sample valve 174. Thus, each sample reservoir can be selectively isolated from other sample reservoirs using the corresponding sample valves 174.

To individually flow the sample of interest toward a corresponding channel 128 of the flow cell 125 and away from the pump manifold assembly 110, the sample valves 174, the pump valves 178, and/or the pumps 176 can be selectively actuated to urge the sample of interest toward the flow cell cartridge assembly 102 and into the respective channels 128 of the flow cell 103. In some implementations, each channel 128 of the flow cell 103 receives the sample of interest. In other implementations, one or more of the channels 128 selectively receives the sample of interest and others of the channels 128 do not receive the sample of interest. The channels 128 of the flow cell 103 that may not receive the sample of interest may receive a wash buffer instead, for example.

The drive assembly 112 interfaces with the sipper manifold assembly 106 and the pump manifold assembly 110 to flow one or more reagents that interact with the sample within the flow cell 103. In an implementation, a reversible terminator is attached to the reagent to allow a single nucleotide to be incorporated onto a growing DNA strand. In some such implementations, one or more of the nucleotides has a unique fluorescent label that emits a color when excited. The color (or absence thereof) is used to detect the corresponding nucleotide. In the implementation shown, the imaging system 116 excites one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 116 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 112 interfaces with the sipper manifold assembly 106 and the pump manifold assembly 110 to flow another reaction component (e.g., a reagent) through the flow cell 103 that is thereafter received by the waste reservoir 118 via a primary waste fluidic line 186 and/or otherwise exhausted by the system 100. Some reaction components perform a flushing operation that chemically cleaves the fluorescent label and the reversible terminator from the sstDNA. The sstDNA is then ready for another cycle.

The primary waste fluidic line 186 is coupled between the pump manifold assembly 110 and the waste reservoir 118. In some implementations, the pumps 176 and/or the pump valves 178 of the pump manifold assembly 110 selectively flow the reaction components from the flow cell cartridge assembly 102, through the fluidic line 184 and the sample loading manifold assembly 108 to the primary waste fluidic line 186.

The flow cell cartridge assembly 102 is coupled to a central valve 188 via the flow cell interface 126. An auxiliary waste fluidic line 190 is coupled to the central valve 188 and to the waste reservoir 118. In some implementations, the auxiliary waste fluidic line 190 receives excess fluid of a sample of interest from the flow cell cartridge assembly 102, via the central valve 188, and flows the excess fluid of the sample of interest to the waste reservoir 117 when back loading the sample of interest into the flow cell 103, as described herein. That is, the sample of interest may be loaded from the rear of the flow cell 103 and any excess fluid for the sample of interest may exit from the front of the flow cell 103. By back loading samples of interest into the flow cell 103, different samples can be separately loaded to corresponding channels 128 and the single flow cell manifold 137 can couple the front of the flow cell 103 to the central valve 188 to direct excess fluid of each sample of interest to the auxiliary waste fluidic line 190. Once the samples of interest are loaded into the flow cell 103, the flow cell manifold 137 can be used to deliver common reagents from the front of the flow cell 103 (e.g., upstream) for each channel 128 that exit from the rear of the flow cell 125 (e.g., downstream). Put another way, the sample of interest and the reagents may flow in opposite directions through the channels 128 of the flow cell 103.

Referring to the sipper manifold assembly 106, in the implementation shown, the sipper manifold assembly 106 includes a shared line valve 192 and a bypass valve 194. The shared line valve 192 may be referred to as a reagent selector valve. The central valve 188 and the valves 192, 194 of the sipper manifold assembly 106 may be selectively actuated to control the flow of fluid through fluidic lines 196, 198, 200. One or more of the valves 196, 198, 200 may be implemented by a rotary valve, a pinch valve, a flat valve, a solenoid valve, a check valve, a piezo valve, etc. Other fluid control devices may prove suitable.

The sipper manifold assembly 106 may be coupled to a corresponding number of reagents reservoirs 202 via reagent sippers 204. The reagent reservoirs 202 may contain fluid (e.g., reagent and/or another reaction component). In some implementations, the sipper manifold assembly 106 includes a plurality of ports. Each port of the sipper manifold assembly 106 may receive one of the reagent sippers 204. The reagent sippers 204 may be referred to as fluidic lines.

The shared line valve 192 of the sipper manifold assembly 106 is coupled to the central valve 188 via the shared reagent fluidic line 196. Different reagents may flow through the shared reagent fluidic line 196 at different times. In an implementation, when performing a flushing operation before changing between one reagent and another, the pump manifold assembly 110 may draw wash buffer through the shared reagent fluidic line 196, the central valve 188, and the flow cell cartridge assembly 102. Thus, the shared reagent fluidic line 196 may be involved in the flushing operation.

While one shared reagent fluidic line 196 is shown, any number of shared fluidic lines may be included in the system 100.

The bypass valve 194 of the sipper manifold assembly 106 is coupled to the central valve 188 via the dedicated reagent fluidic lines 198, 200. The central valve 188 may have one or more dedicated ports that correspond to the dedicated reagent fluidic lines 198, 200. Each of the dedicated reagent fluidic lines 198, 200 may be associated with a single reagent. The fluids that may flow through the dedicated reagent fluidic lines 198, 200 may be used during sequencing operations and may include a cleave reagent, an incorporation reagent, a scan reagent, a cleave wash, and/or a wash buffer. Thus, when performing a flushing operation before changing between one reagent and another in association with the bypass valve 194, the sipper manifold assembly 106 may draw wash buffer through the central valve 188 and/or the flow cell cartridge assembly 102. However, because only a single reagent may flow through each of the dedicated reagent fluidic lines 198, 200, the dedicated reagent fluidic lines 198, 200 themselves may not be flushed. The approach of including dedicated reagent fluidic lines 198, 200 may be advantageous when the system 100 uses reagents that may have adverse reactions with other reagents. Moreover, reducing a number of fluidic lines or length of the fluidic lines that are flushed when changing between different reagents reduces reagent consumption and flush volume and may decrease cycle times of the system 100. While two dedicated reagent fluidic lines 198, 200 are shown, any number of dedicated fluidic lines may be included in the system 100.

The bypass valve 194 is also coupled to the cache 180 of the pump manifold assembly 110 via the bypass fluidic line 182. One or more reagent priming operations, hydration operations, mixing operations, and/or transfer operations may be performed using the bypass fluidic line 182. The priming operations, the hydration operations, the mixing operations, and/or the transfer operations may be performed independent of the flow cell cartridge assembly 102. Thus, the operations using the bypass fluidic line 182 may occur during, for example, incubation of one or more samples of interest within the flow cell cartridge assembly 102. That is, the shared line valve 192 can be utilized independently of the bypass valve 194 such that the bypass valve 194 can utilize the bypass fluidic line 182 and/or the cache 180 to perform one or more operations while the shared line valve 192 and/or the central valve 188 simultaneously, substantially simultaneously, or offset synchronously perform other operations. Thus, the system 100 can perform multiple operations at once, thereby reducing run time.

Referring now to the drive assembly 112, in the implementation shown, the drive assembly 112 includes a pump drive assembly 206 and a valve drive assembly 208. The pump drive assembly 206 may be adapted to interface with the one or more pumps 176 to pump fluid through the flow cell 103 and/or to load one or more samples of interest into the flow cell 103. The valve drive assembly 208 may be adapted to interface with one or more of the valves 174, 178, 188, 192, 194 to control the position of the corresponding valves 174, 178, 188, 192, 194.

Referring to the controller 114, in the implementation shown, the controller 114 includes a user interface 210, a communication interface 212, one or more processors 214, and a memory 216 storing instructions executable by the one or more processors 214 to perform various functions including the disclosed implementations. The user interface 210, the communication interface 133, and the memory 216 are electrically and/or communicatively coupled to the one or more processors 214.

In an implementation, the user interface 210 is adapted to receive input from a user and to provide information to the user associated with the operation of the system 100 and/or an analysis taking place. The user interface 210 may include a touch screen, a display, a key board, a speaker(s), a mouse, a track ball, and/or a voice recognition system. The touch screen and/or the display may display a graphical user interface (GUI).

In an implementation, the communication interface 212 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 214 and/or the system 100 may include one or more of a processor-based system(s) or a microprocessor-based system(s). In some implementations, the one or more processors 214 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 216 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 2:
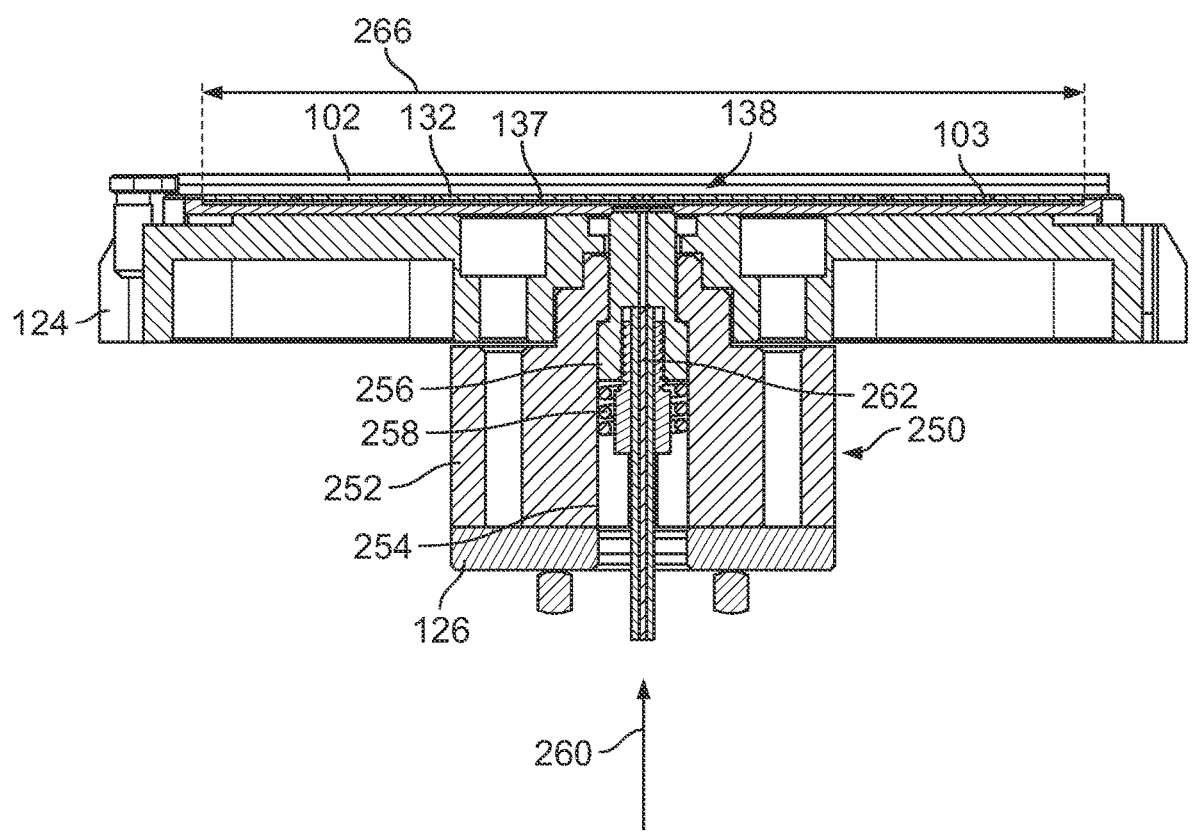
FIG. 2 is a detailed cross-sectional view of an example implementation of a first portion of the flow cell interface of FIG. 1 and the vacuum chuck and the flow cell cartridge assembly illustrating the first end of the flow cell of FIG. 1.

FIG. 2 is a detailed cross-sectional view of an example implementation of a first portion 250 of the flow cell interface 126 of FIG. 1 and the vacuum chuck 124 and the flow cell cartridge assembly 102 illustrating the first end 132 of the flow cell 103 of FIG. 1. The first portion 250 of the flow cell interface 126 is positioned to establish a fluidic connection with the gasket assembly 138 associated with the flow cell manifold 137 of the flow cell cartridge assembly 102.

In the implementation shown, the first portion 250 of the flow cell interface 126 includes a plunger guide 252 that includes a plunger bore 254 in which a plunger 256 is positioned. A spring 258 is shown positioned to bias the corresponding plunger 256 in a direction generally indicated by arrow 260 and into engagement with the corresponding gasket assembly 138. The plunger 256 defines a fluidic path 262 that allows fluid to pass therethrough. As also shown in FIG. 2, the vacuum chuck 124 supports a substantial width 266 of the flow cell 103. Additionally, the vacuum chuck 124 may support a substantial length or the entire length of the flow cell 103 between the ends 132, 135.

Figure 3:
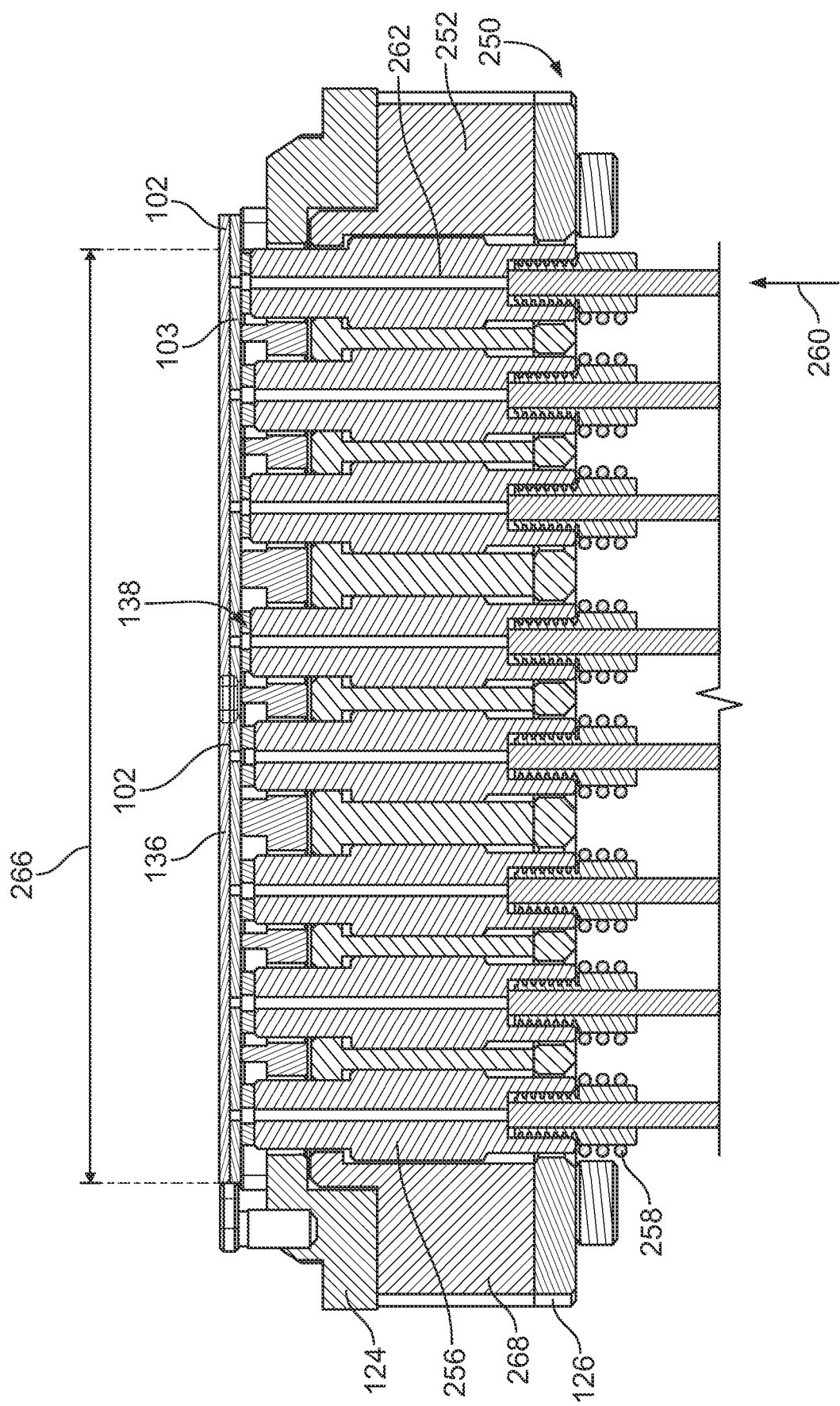
FIG. 3 is a detailed cross-sectional view of an example implementation of a second portion of the flow cell interface of FIG. 1 and the vacuum chuck and the flow cell cartridge assembly illustrating the second end of the flow cell of FIG. 1.

FIG. 3 is a detailed cross-sectional view of an example implementation of a second portion 268 of the flow cell interface 126 of FIG. 1 and the vacuum chuck 124 and the flow cell cartridge assembly 102 illustrating the second end 135 of the flow cell 103 of FIG. 1. The second portion 268 of the flow cell interface 126 is positioned to establish a fluidic connection with the gasket assemblies 138 at the second end 135 of the flow cell 103.

In the implementation shown, the second portion 268 of the flow cell interface 126 includes the plunger guide 252 including the plunger bores 254 in which corresponding plungers 256 are positioned. The springs 258 are positioned to bias the corresponding plunger 256 in a direction generally indicated by arrow 260 and into engagement with the corresponding gasket assembly 138.

Figure 4:
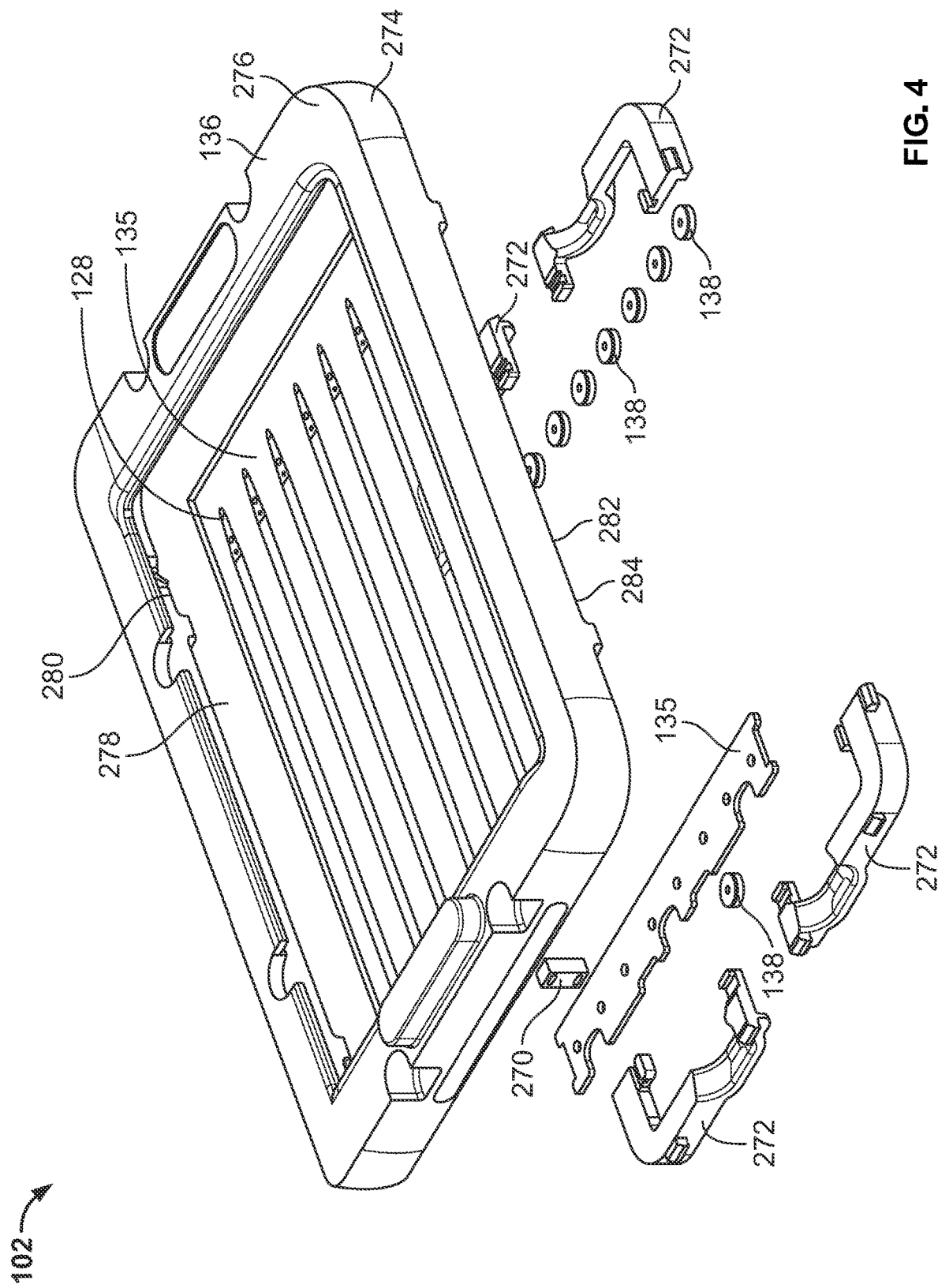
FIG. 4 is an isometric expanded view of an example implementation of the flow cell cartridge assembly of FIG. 1.

FIG. 4 is an isometric expanded view of an example implementation of the flow cell cartridge assembly 102 of FIG. 1. In the implementation shown, the flow cell cartridge assembly 102 includes the flow cell frame 136, the flow cell 103 having a plurality of the channels 128, the flow cell manifold 137, and the gasket assemblies 138. The flow cell cartridge assembly 102 also includes a radio frequency identification (RFID) tag 270 that is used for tracking and/or identification purposes and a plurality of retaining clips 272 that are used to retain the flow cell 103, the flow cell manifold 137, and/or the RFID tag 270 within or relative to the flow cell frame 136.

Referring to the flow cell frame 136, in the implementation shown, the flow cell frame 136 has perimeter walls 274 and a top surface 276. The perimeter walls 274 and the top surface 276 define a cavity 278. The cavity 278 includes an upper opening 280 and a lower opening 282. The upper opening 280 is defined by the top surface 276 and may allow image data to be obtained of the flow cell 103 using the imaging system 116. The lower opening 282 is defined by a lower edge 284 of the perimeter walls 274 and may allow for the sample of interest to be loaded into the channels 128 of the flow cell 103 through the different gasket assemblies 138.

FIG. 5 is a bottom plan view of the flow cell cartridge assembly 102 of FIG. 4. As shown, the flow cell manifold 137 includes the single inlet 140, the fluidic lines 144, and the outlets 142. As mentioned above, the inlet 140 of the flow cell manifold 137 is coupled to each of the outlets 142, via the fluidic lines 144. The flow cell manifold 137 and its fluidic lines 144 may allow less valving to be used to control fluid flow through the flow cell cartridge assembly 102.

Figure 6:
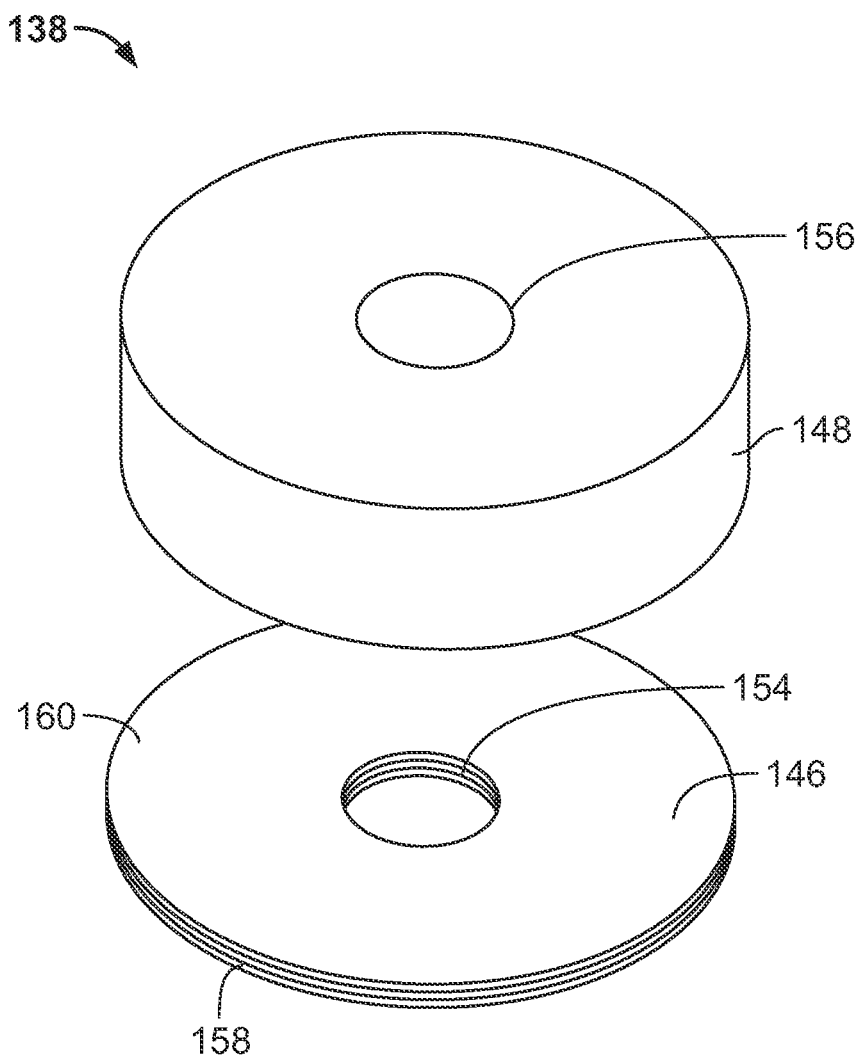
FIG. 6 is an expanded isometric view of an example implementation of the gasket assembly of FIG. 1 including the adhesive stack and the gasket that each define a corresponding through hole.

FIG. 6 is an expanded isometric view of an example implementation of the gasket assembly 138 of FIG. 1 including the adhesive stack 146 and the gasket 148 that each define one of the corresponding through holes 154, 156. The gasket 148 may be formed from a silicon sheet and the adhesive stack 146 may be double-coated tape with PET and/or a transfer adhesive. Generally, the gasket assembly 138 may include a thermally stable adhesive and gasket material may be capable of surviving multiple thermal cycles between approximately 20° C. and approximately 60° C., and have a shelf life of approximately 18 months for materials.

To form the adhesive stack 146 and/or the gasket 148, the adhesive stack 146 and/or the gasket 148 can be cut using a laser cutting process, a die cutting process, a knife/flash cutting process, and/or a water jet cutting process. These or other processes allow the gaskets 148 to be formed with less defects and without or less knit defects.

Figure 7:
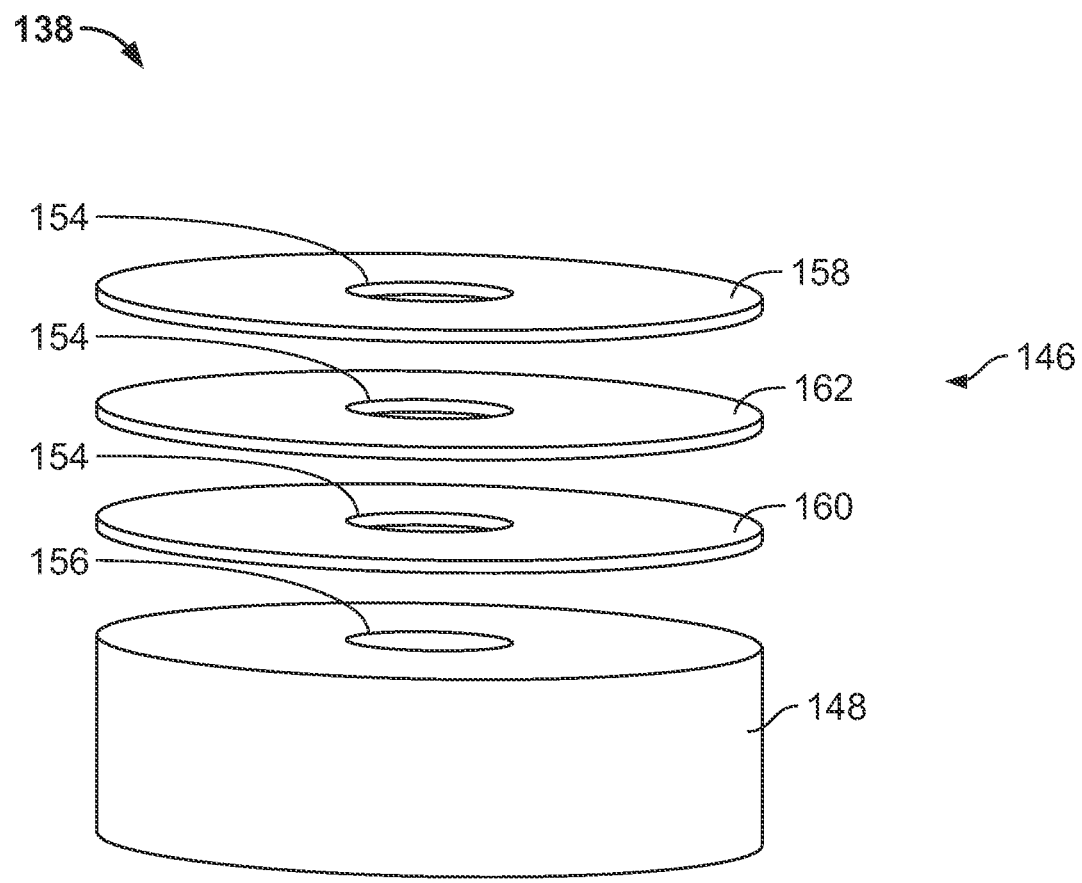
FIG. 7 is an expanded isometric view of an example implementation of the gasket assembly of FIG. 1 illustrating the gasket, the first adhesive, the second adhesive, and the separating layer.

FIG. 7 is an expanded isometric view of an example implementation of the gasket assembly 138 of FIG. 1 illustrating the gasket 148, the first adhesive 158, the second adhesive 160, and the separating layer 162. In some implementations, the gasket assembly 138 has a diameter of approximately 4 millimeters (mm)+/−0.2 mm, the through hole 154 and/or 156 has a diameter of approximately 1 millimeter (mm)+/−0.1 mm, the thickness of the gasket 148 is approximately 1.0 mm m+/−0.1 mm, the gasket 148 has a hardness of approximately 30 Shore A+/−5 Shore A, and the adhesive stack 146 has a thickness of approximately 75 micrometers (μm). While thicknesses and/or diameters are mentioned in association with the gasket assembly 138 and/or its components 148, 154, 156, 158,160, 162, other sizes and/or diameters may prove suitable.

Figure 8:
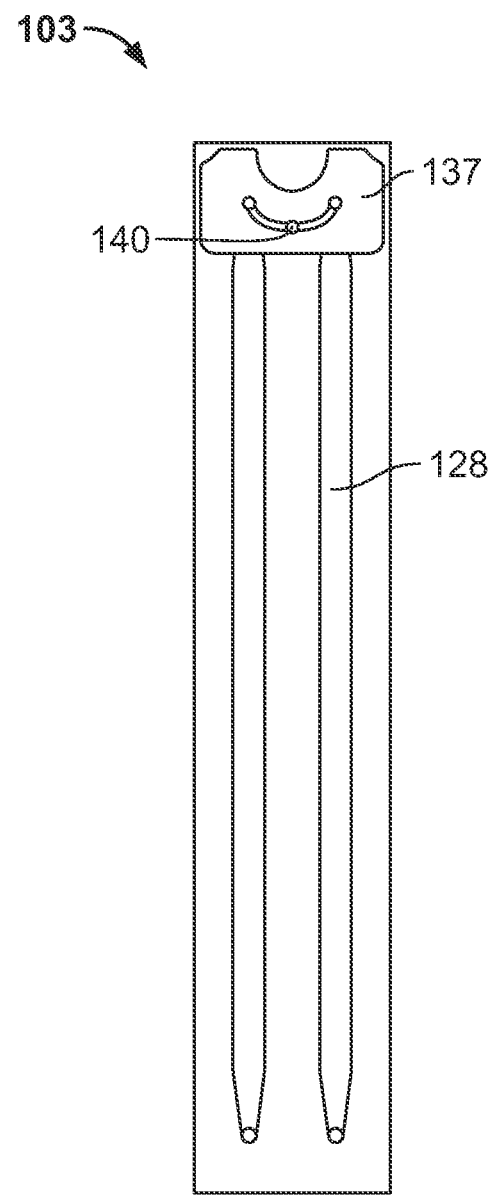
FIG. 8 illustrates a plan view of another implementation of the flow cell that can be used with the system of FIG. 1.

FIG. 8 illustrates a plan view of another implementation of the flow cell 103 that can be used with the system 100 of FIG. 1. In contrast to the implementation of FIG. 4, the flow cell 103 of FIG. 8 includes two channels 128 and has a lesser width. While the gasket assemblies 138 are not shown coupled to the flow cell 103 of FIG. 8, the gasket assemblies 138 may be included in a manner similar to how the gasket assemblies 138 are coupled to the flow cell 103 of FIG. 4. While two channels 128 are shown, any number of channels may be included instead such as, for example, six channels or one channel. If the flow cell 103 includes one channel, the flow cell manifold 137 may be omitted.

Figure 9:
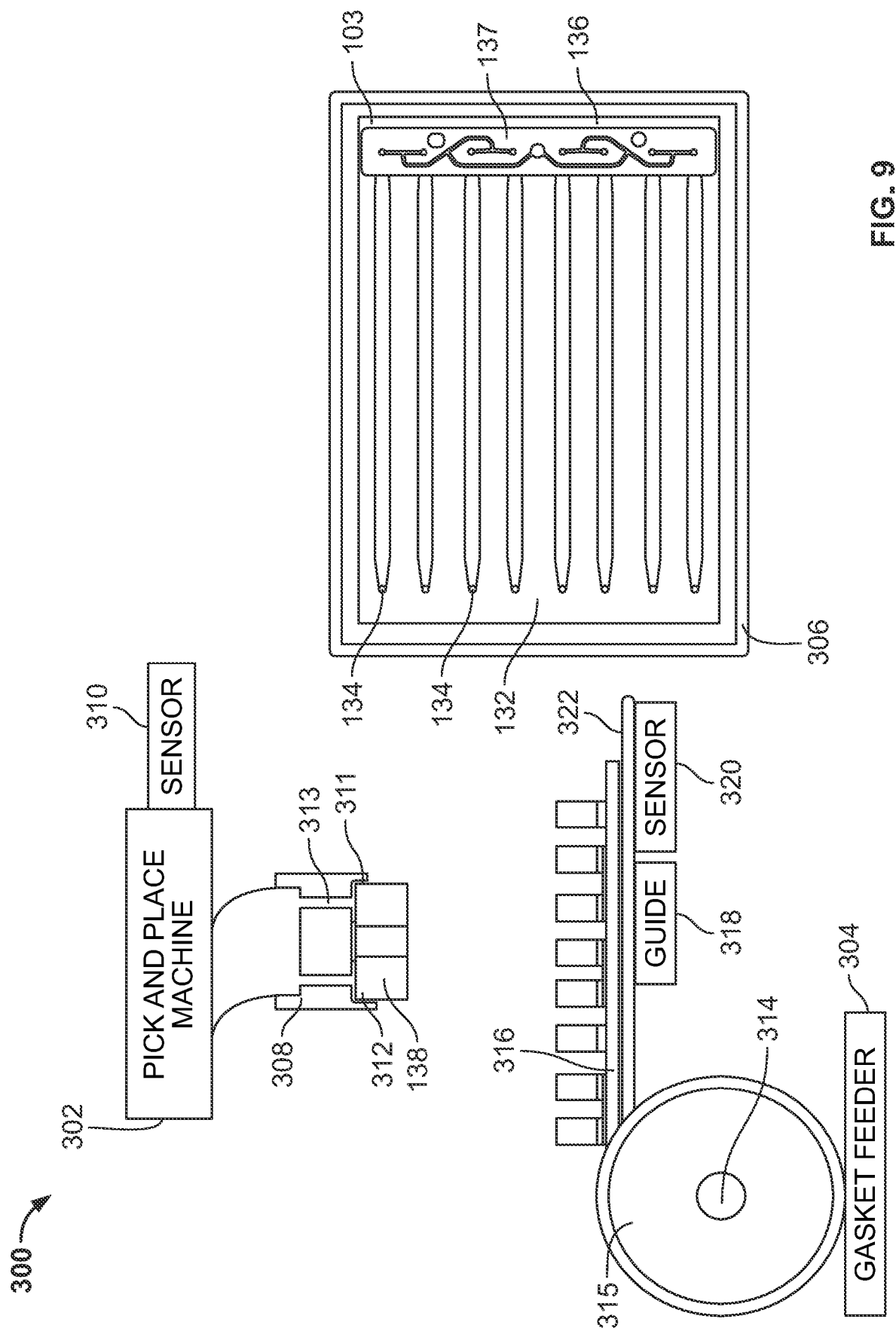
FIG. 9 is a system that can be used to assemble flow cells in accordance with the teachings of this disclosure.

FIG. 9 is a system 300 that can be used to assemble flow cells 103 in accordance with the teachings of this disclosure. In the implementation shown, the system 100 includes a pick-and-place machine 302, a gasket feeder 304, and a carrier 306 that receives the flow cell 103 during the assembly process. The pick-and-place machine 302 may be a Fuji pick and place (PNP) machine and may include a head 308 that is used to pick up and place the gasket assemblies 138 and a sensor 310 used to obtain location data. The location data may include the position of the gasket assembly 138 and/or the flow cell 103 being assembled and can be used to identify the flow cell fiducials, the flow cell manifold fiducials, and/or the gasket assembly 138 fiducials through optical detection or other processes.

The head 308 of the pick-and-place machine 302 defines a recess 311 that receives an end portion 312 of the gasket assembly 138 and includes a pair of arc-shaped apertures 313 that allows a coupling to be created between the head 308 and the gasket assembly 138. The gasket feeder 304 has a spool 314 that receives a roll 315 including the gasket assemblies 138 on a tape 316. The tape 316 may be a low tack tape and may be referred to as a liner assembly. The gasket feeder 304 also includes a guide 318 that guides the tape 316 as the gasket assemblies 138 are dispensed during the assembly process and a sensor 320 that senses when a gasket assembly 138 is at a pick-up location 322 on the gasket feeder 304. In response to the sensor 320 sensing the gasket assembly 138 at the pick-up location 322, the gasket feeder 304 may stop feeding the gasket assemblies 138 until, for example, the gasket assembly 138 at the pick-up location 322 is picked up by the head 308.

In operation, the pick-and-place machine 302 obtains location data from the sensors 310 and/or 320 and, based on the location data, the pick-and-place machine 302 causes the head 308 to pick up one or more of the gasket assemblies 138 from the tape 316 and align the gasket assembly 138 with one of the second openings 134 of the channels 128 of the flow cell 103. Once aligned, the head 308 moves to couple the gasket assembly 138 to the flow cell 103 at the corresponding second channel opening 134 by pressing the gasket 138 into engagement with the flow cell 103. The pick-and-place machine 302 may repeat the process of coupling the gasket assemblies 138 to the flow cell 103 until each of the second channel openings 134 has one of the gasket assemblies 138 attached adjacent thereto. The pick-and-place machine 302 may also attach the flow cell manifold 137 and the associated gasket assembly 138 to the first end 132 of the flow cell 103 in a similar manner. In implementations when the flow cell manifold 137 is omitted, the pick-and-place machine 302 can couple corresponding gasket assemblies 138 to each of the first channel openings 130 in a similar manner as the gasket assemblies 138 are coupled at the second channel openings 134.

A flow cell assembly including the flow cell 103 and the associated components 137, 138 may then be unloaded from the carrier 306 and/or from the system 100. Quality control procedures may be performed on the flow cell 103 including, for example, scanning the flow cell 103 and/or pressure testing the flow cell 103 to verify fluidic integrity. A barcode label may be affixed to the flow cell 103. After the quality tests are performed, the flow cell assembly may be secured within the flow cell frame 136.

FIG. 10 illustrates an isometric view of the head 308 that can be used with the system 100 of FIG. 9. In the implementation shown, the head 308 includes an end 324 that includes the recess 311 that receives the end portion 312 of the gasket assembly 138 and the arc-shaped apertures 313. The arc-shaped apertures 313 may extend through a length of the head 308 or a portion of a length of the head 308.

FIG. 11 is a cross-sectional view of a portion of the roll 315 of gasket assemblies 138 that can be used with the system 100 of FIG. 9. In the implementation shown, the roll 315 includes the gasket assembly 138 and the tape 316 to which the gasket assembly 138 is removably coupled. The tape 316 includes a release liner 352, a permanent adhesive 354, and a foil layer 356. The permanent adhesive 364 may bond the foil layer 356 and the release liner 352 and ensures that the release liner 352 does not detach with the gasket assembly 138 when the gasket assembly 138 is removed. The foil layer 356 may be used to stop a laser from cutting through the entire tape 316 during a laser cutting process, leaving gasket assemblies 138 on the release liner 352 for easy removal.

In some implementations, dry-ice cleaning may be used to remove debris. The tape 316 also includes a third adhesive 358 and a PET layer 360. The third adhesive 358 bonds the foil layer 356 and the PET layer 360 and the PET layer 360 may deter the foil layer 356 from wrinkling. In other implementations, the third adhesive 358 may be barrier coating and the PET layer 360 may be a heat sealing coating. A liner 362 may also be provided over the gasket assembly 138 to deter the gasket assembly 138 from coupling to the tape 316 of another layer of the roll 315. To produce the roll 315 with the single row of the gasket assemblies 138 as shown in FIG. 11, a larger roll with a plurality of rows of the gasket assemblies 138 (e.g., four rows) may be cut using a slitting machine.

Figure 12:
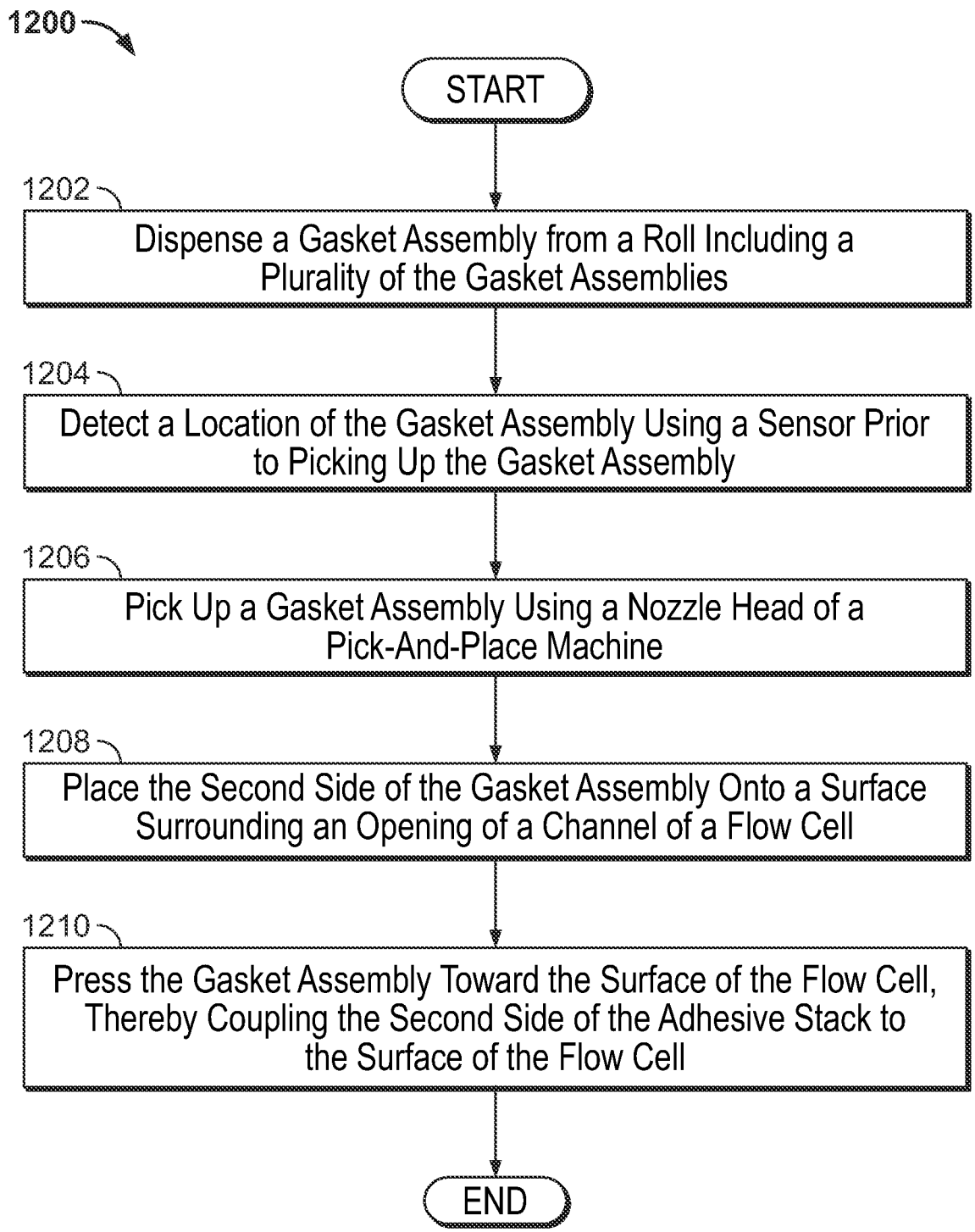
FIG. 12 illustrates a flowchart for a method of assembling a portion of the flow cell cartridge assembly of FIG. 1 or any of the flow cells disclosed herein using the system of FIG. 9.

FIG. 12 illustrates a flowchart for a method of assembling a portion of the flow cell cartridge assembly 102 of FIG. 1 or any of the flow cells 103 disclosed herein using the system 300 of FIG. 9. The order of execution of the blocks may be changed, and/or some of the blocks described may be changed, eliminated, combined and/or subdivided into multiple blocks.

The process 1200 begins with a gasket assembly 138 being dispensed from the roll 315 including a plurality of the gasket assemblies 138 (Block 1202). Dispensing the gasket assembly 138 from the roll 315 may include passing the gasket assembly 138 through the guide 318 of the gasket feeder 304. A location of the gasket assembly 138 is detected using the sensor 320 (Block 1204). The location of the gasket assembly 138 may be associated with the gasket assembly 138 being located at the pick-up location 322. The gasket assembly 138 is picked up using the head 324 of the pick-and-place machine 302 (Block 1206). The gasket assembly 138 includes the adhesive stack 146 and the gasket 148. The adhesive stack 146 has the first side 150 bonded to the gasket 148 and includes the first adhesive 158 on the first side 150 of the adhesive stack 146, the second adhesive 160 on the second side 152 of the adhesive stack 146, and the separating layer 162 that is positioned between the first adhesive 158 and the second adhesive 160. In some implementations, the first adhesive 158 includes an acrylic adhesive, the second adhesive 160 includes a silicone adhesive, and the separating layer 162 includes a polyethylene terephthalate layer.

The second side 152 of the gasket assembly 138 is placed onto a surface surrounding an opening 130, 134 of the channel 128 of the flow cell 103 (Block 1208) and the gasket assembly 138 is pressed toward the surface of the flow cell 103, thereby coupling the second side 152 of the adhesive stack 146 to the surface of the flow cell 103 (Block 1210).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," "including," "having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   a flow cell including a channel including a channel opening;
   a gasket assembly coupled at the channel opening, the gasket assembly, comprising:
   an adhesive stack; and
   a gasket, the adhesive stack comprising a first side bonded to the gasket and a second side bonded to the flow cell;
   a frame comprising perimeter walls and a top surface that defines a cavity including an upper opening and a lower opening; and
   a plurality of retaining clips that are used to retain the flow cell relative to the frame.

2. The apparatus of claim 1, wherein the adhesive stack has a through hole and the gasket has a through hole that is aligned with the through hole of the adhesive stack to enable fluidic communication through the gasket assembly.

3. The apparatus of claim 1, wherein the adhesive stack comprises a first adhesive coupled to the flow cell and a second adhesive coupled to the gasket and positioned between the first adhesive and the gasket.

4. The apparatus of claim 3, wherein the gasket assembly further comprises a separating layer positioned between the first adhesive and the second adhesive, the first adhesive bonding to both the flow cell and the separating layer and the second adhesive bonding to both the separating layer and the gasket.

5. The apparatus of claim 4, wherein the separating layer comprises polyethylene terephthalate.

6. The apparatus of claim 4, wherein the separating layer comprises a through hole and the gasket has a through hole aligned with the through hole of the separating layer and wherein the first adhesive coats a first side of the separating layer and the second adhesive coats a second side of the separating layer.

7. The apparatus of claim 4, wherein the first adhesive comprises acrylic adhesive.

8. The apparatus of claim 4, wherein the second adhesive comprises silicone adhesive.

9. The apparatus of claim 1, further comprising a flow cell manifold coupled to a first end of the flow cell and including a flow cell manifold inlet, a plurality of fluidic lines, and a plurality of flow cell manifold outlets fluidically coupled to the flow cell manifold inlet by the corresponding fluidic lines, each of the flow cell manifold outlets being coupled to a corresponding first channel opening of the flow cell.

10. The apparatus of claim 9, further comprising a manifold gasket assembly coupled to the flow cell manifold inlet.

11. The apparatus of claim 10, wherein the manifold gasket assembly comprises a first adhesive coupled to the flow cell manifold, a gasket, and a second adhesive coupled to the gasket and positioned between the first adhesive and the second adhesive.

12. The apparatus of claim 10, wherein the flow cell manifold comprises a laminate.

13. The apparatus of claim 1, wherein the flow cell comprises a plurality of the channels.

14. The apparatus of claim 1, wherein the lower opening is defined by the perimeter walls.

15. An apparatus, comprising:
   a flow cell assembly, comprising;
      a flow cell comprising a plurality of channels, each channel comprising a first channel opening and a second channel opening;
      a flow cell manifold coupled to the flow cell and including a flow cell manifold inlet, a plurality of fluidic lines, and a plurality of flow cell manifold outlets fluidically coupled to the flow cell manifold inlet by the corresponding fluidic lines, each of the flow cell manifold outlets being coupled to a corresponding first channel opening of the flow cell; and
      a plurality of gaskets assemblies, comprising:
         an adhesive stack; and
         a gasket, the adhesive stack comprising a first side bonded to the gasket and a second side,
      wherein the second side of the gasket assemblies are bonded to the flow cell at the second channel openings and to the flow cell manifold at the flow cell manifold inlet;
   a system, comprising:
      a vacuum chuck to support the flow cell; and
      a flow cell interface to establish a fluidic coupling between the system and the flow cell, wherein the flow cell interface comprises:
         a plurality of plunger bores corresponding to the gasket assemblies;
         a plurality of plungers, each plunger positioned in one of the plunger bores and defining a fluid path to enable fluid to pass therethrough; and
         springs positioned to bias the corresponding plunger into engagement with the corresponding gasket assembly.

16. The apparatus of claim 15, wherein the flow cell assembly comprises a frame that carries the flow cell, the flow cell manifold, and the gasket assemblies.

17. The apparatus of claim 16, wherein the frame comprises perimeter walls and a top surface that defines a cavity including an upper opening and a lower opening.

18. The apparatus of claim 17, wherein the upper opening is defined by the top surface and the lower opening is defined by a lower edge of the perimeter walls.

19. The apparatus of claim 17, wherein the system comprises an imaging system, wherein the upper opening of the frame allows image data to be obtained of the flow cell using the imaging system.

20. The apparatus of claim 17, wherein the lower opening allows for a sample of interest to be loaded into the channels of the flow cell through the different gasket assemblies.

\* \* \* \* \*